Aug. 22, 1961 D. L. RALL ET AL 2,997,513
THERMOCOUPLE
Filed July 30, 1957

INVENTORS
DIETER L. RALL
WARREN H. GIEDT
BY Mellin and Hanson
ATTORNEYS

United States Patent Office 2,997,513
Patented Aug. 22, 1961

2,997,513
THERMOCOUPLE
Dieter L. Rall, Redwood City, and Warren H. Giedt, San Francisco, Calif., assignors to American Radiator & Standard Sanitary Corporation, New York, N.Y., a corporation of Delaware
Filed July 30, 1957, Ser. No. 675,208
1 Claim. (Cl. 136—4)

This invention relates to and in general has for its object the provision of a thermocouple for use in determining the temperature distribution between the opposed parallel faces of a metallic or non-metallic plate.

One of the factors encountered in designing missiles for high speed operation is aerodynamic heating on the surface of the shell of a missile as a result of air friction during its flight fall. Since the heat transferred is sufficient to melt the outer surface of the shell of the missile, it is extremely important to determine the heat flow through the plate forming the shell or skin of the missile. Although it is possible to theoretically calculate the heat flow, to be certain of just what is taking place in this respect it is desirable to actually measure the resulting temperature at various points within the skin plate from which the actual heat flow can be calculated and compared with theoretical predictions.

More specifically, then, one of the objects of this invention is the provision of a thermocouple unit made of a material identical to the material of the plate, in which the temperature distribution is to be determined, and having embedded therein in a plane parallel with the ends of the unit, a bimetal thermocouple junction arranged to be connected, through suitably insulated leads, with a sensing device.

Another object of this invention is the provision of a method for making a thermocouple unit of the character above described wherein the juncture of two dissimilar metals is sandwiched between two plates of predetermined gauge with the leads to said juncture extending through one of said plates, wherein said plates are then bonded together as by welding in the case of metal plates so as to form an integral unitary structure substantially devoid of any internal air interface, and wherein a cylinder is cut from the resulting structure for mounting within a plate in which the temperature distribution is to be determined.

The invention possesses other advantageous features, some of which, with the foregoing, will be set forth at length in the following description where those forms of the invention which have been selected for illustration in the drawings accompanying and forming a part of the present specification, are outlined in full. In said drawings, two forms of the invention are shown, but it is to be understood that it is not limited to such forms, since the invention as set forth in the claims may be embodied in other forms.

Referring to the drawings.

Figure 1:
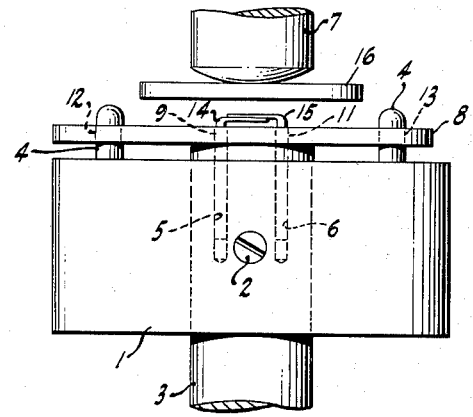
FIG. 1 is a schematical representation of one method of making a thermocouple unit embodying the objects of our invention, the thermocouple per se being shown in an intermediate stage of construction.

The method illustrated in FIG. 1 involves the use of a horizontal jig or table 1 conveniently made of Micarta. Extending upwardly through the jig 1, and secured thereto by set screws 2, is a lower welding electrode 3 of a welding machine, not shown. Mounted on top of the jig 1 as an integral part thereof is a plurality of orienting or guide pins 4 extending upwardly slightly above the level of the upper end of the welding electrode 3. Formed in the electrode is a pair of spaced, symmetrically disposed, vertically extending electric lead receiving holes or bores 5 and 6.

Mounted over the jig 1 coaxially with the electrode 3 is the vertically movable upper electrode 7 of said welding machine.

In the use of the equipment thus far described for producing a thermocouple unit embodying the objects of our invention, a lower plate 8 is seated over the upper end of the lower electrode 3, the plate 8 being provided with a pair of holes 9 and 11 formed on identical centers as the holes or bores 5 and 6. Also provided in the plate 8 are holes 12 and 13 arranged to register with and receive the pins 4 and thus bring the holes 9 and 11 of the plate 8 into alignment, respectively, with the bores 5 and 6 of the electrode 3.

Following this, bimetal elements 14 and 15 or the leads therefor are inserted through the holes 9 and 11 into the bores 5 and 6, the upper ends of these elements being bent downwardly into overlapping relationship with each other so as to form a conventional bimetal junction of a thermocouple.

Finally, an upper plate 16 is placed over the bimetal junction, the upper electrode 7 is lowered into engagement with the plate 16, and the welding machine is activated, thereby to form the two plates 8 and 16 and the intervening bimetal junction into an integral unitary structure substantially devoid of any internal air interface.

Here it should be noted that the plates 8 and 16 should be made of a metal identical with the metal of the plate in which the temperature distribution is to be determined. The bimetal juncture can be formed of conventional pairs of wire of materials such for example as iron-constantin, Chromel-Alumel, or platinum-platinum 10% rhodium. Although there is nothing critical as to the size of the wire used so long as it is of a relatively small gauge, wire of the order of 0.010 inch in diameter has proved to be satisfactory. Before bonding the overlapping sections of the junction it is preferable to flatten each wire to a gauge of 0.001 inch. The remainder of each wire should of course be insulated from the adjacent metal walls of the thermocouple unit. This can be done by coating the free end of each wire with an insulating material or by applying a film of insulating material to the walls of the bores through which the wires pass.

Figure 2:
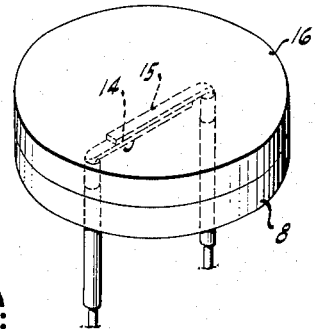
FIG. 2 is an enlarged perspective view of a thermocouple unit embodying the objects of our invention and produced in part by the method illustrated in FIG. 1.

At any event, after the bimetal junction is sandwiched between the two metal plates and formed therewith into an integral structure, it is formed by turning or matching into a plug or cylinder, preferably a right circular cylinder such as illustrated in FIG. 2, and with the bimetal juncture lying in a known plane parallel with the ends of the cylinder. Here it should be noted that the total length of the plug or cylinder should be equal to the gauge of the plate in which the temperature distribution is to be determined.

In using a thermocouple unit such as above described, a hole of a diameter equal to the diameter of the thermocouple unit is drilled through the plate to be tested at right angles to its opposed faces. The thermocouple is then forced into the hole and should just completely fill it. If this condition has been met, the plane of the bimetal juncture relative to the faces of the plate to be tested is of course known. By then connecting the free ends or leads of the thermocouple to a sensing device such as an ammeter calibrated as a direct reading thermometer, the thermocouple can be used to ascertain the temperature within the plate being tested in the plane of the bimetal juncture of the thermocouple.

By providing a number of such thermocouple units wherein the plane of the bimetal juncture of each instrument is variously located, the temperature of various points within the test plate can be determined and plotted, thereby to experimentally determine the temperature gradient of the test plate.

Although in the above description reference has been made specifically only to metal test plates and thermocouples, it is herein contemplated that the test plates may be made of plastic, for there is presently good indication that plastics may serve as better materials for the shells of missiles than metals. This is for the reason that although plastics have lower melting points than metals, they perforce have higher specific heats and lower thermal conductivities and consequently are better able to survive the imposed heating conditions. In the event that the test plates are made of a plastic, the body of the thermocouple should of course then be made of an identical material. The only other difference involved would be with respect to the method of effecting the bimetal juncture within an integral body of the parent plastic. Conveniently this could be done by a conventional molding procedure.

Figure 3:
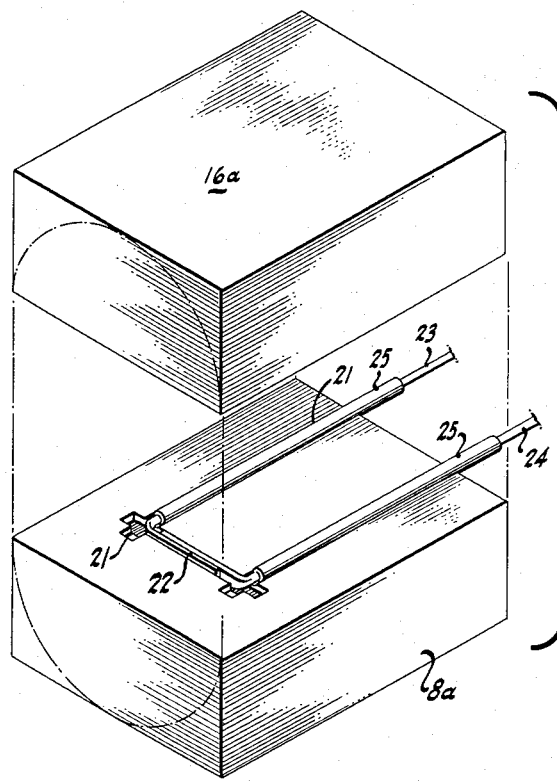
FIG. 3 is an exploded schematic view of a modified method of making a thermocouple unit embodying the objects of our invention.

The method of construction illustrated in FIG. 3 differs from the method above described only in that one of the bimetal juncture supporting plates is provided with a U-shaped channel for the reception of the bimetal juncture and its leads.

More particularly, the method disclosed in FIG. 3 involves the use of a lower plate 8a provided on its upper face with a U-shaped channel 21. Seated in the base of the channel 21 are the overlapping ends of a bimetal juncture 22, the free ends or leads 23 and 24 of this juncture being accommodated in the legs of the U-shaped channel 21. Here it should be noted that the leads 23 and 24 are insulated with a ceramic coating 25.

After this assembly has been effected, an upper plate 16a is placed over the lower plate 8a and spot-welded thereto so as to form an integral unitary structure. A cylinder can then be turned from this structure for use in precisely the same manner as indicated with respect to the modification illustrated in FIG. 2.

In each modification the thermocouple unit is made of the same material as the plate to be tested; its bimetal juncture lies in a plane parallel to the ends thereof; and when installed for use it should be of a length equal to the gauge of the plate under test. The essential factor is the provision of a thermocouple which can be inserted in a plate to be tested as a continuation thereof and which insofar as possible has the same characteristics as the plate under test.

I claim:

The method of determining the temperature within a plate of predetermined material in a predetermined plane within said plate parallel to the faces of said plate comprising: inserting into said plate through one face thereof, and at right angles thereto, a cylinder of a material having the same thermal characteristics as said predetermined material, a thermoelectric element being embedded within said cylinder in said predetermined plane and said thermoelectric element being connected at its ends to leads extending through said cylinder and electrically insulated therefrom except at their junctures with said thermoelectric element in said predetermined plane.

References Cited in the file of this patent

UNITED STATES PATENTS

| | | |
|---|---|---|
| 2,032,407 | Frickey | Mar. 3, 1936 |
| 2,282,441 | Whitlock | May 12, 1942 |
| 2,653,178 | Ruffle | Sept. 22, 1953 |
| 2,671,818 | Turck | Mar. 9, 1954 |
| 2,752,411 | Walter | June 26, 1956 |
| 2,829,185 | Macatician et al. | Apr. 1, 1958 |
| 2,844,637 | Borel et al. | July 22, 1958 |
| 2,921,972 | Kreisler | Jan. 19, 1960 |

OTHER REFERENCES

Automotive Industries, June 15, 1940, page 573.